United States Patent Office 3,218,143
Patented Nov. 16, 1965

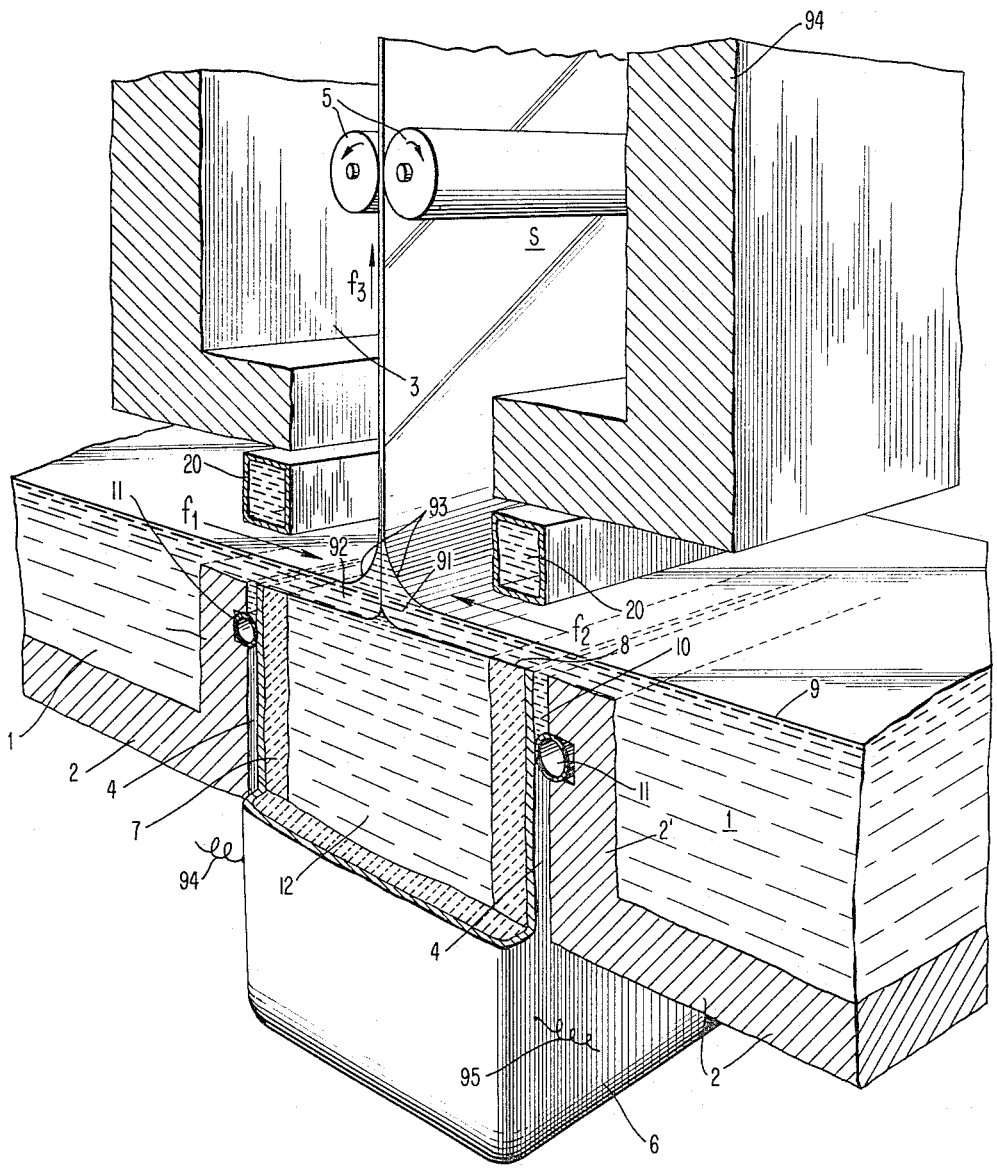

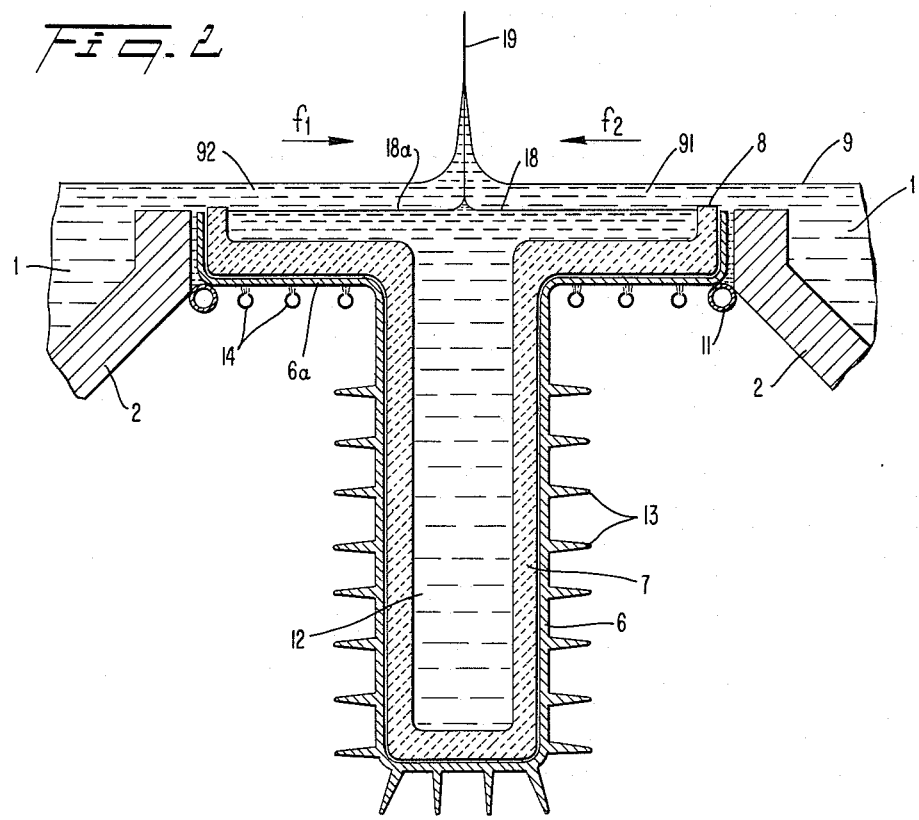
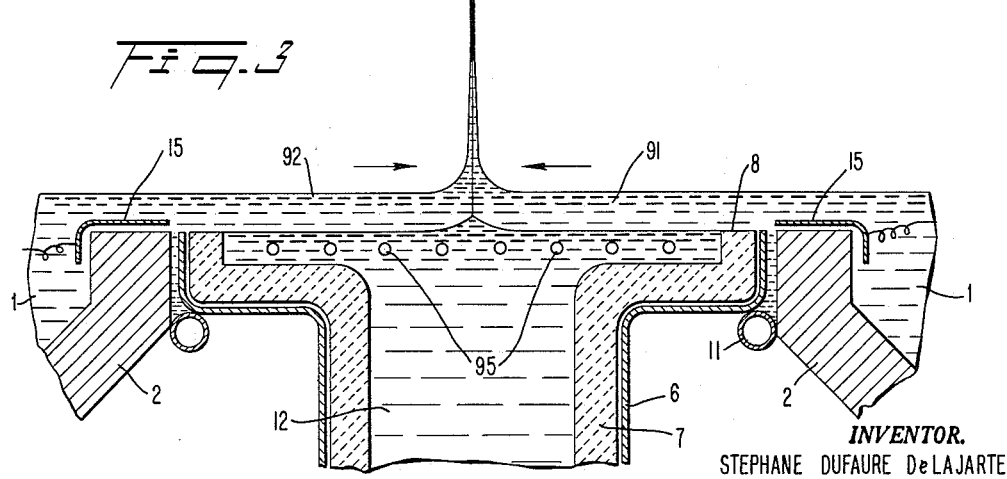

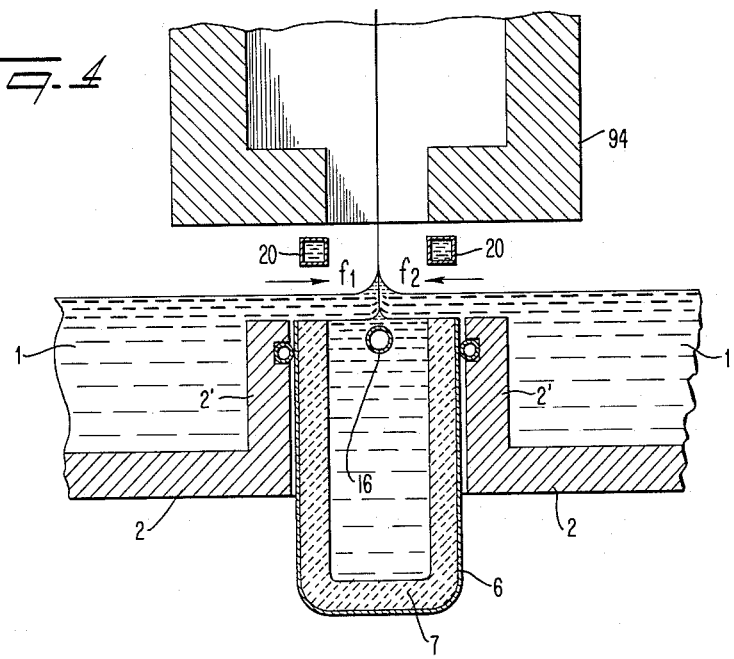
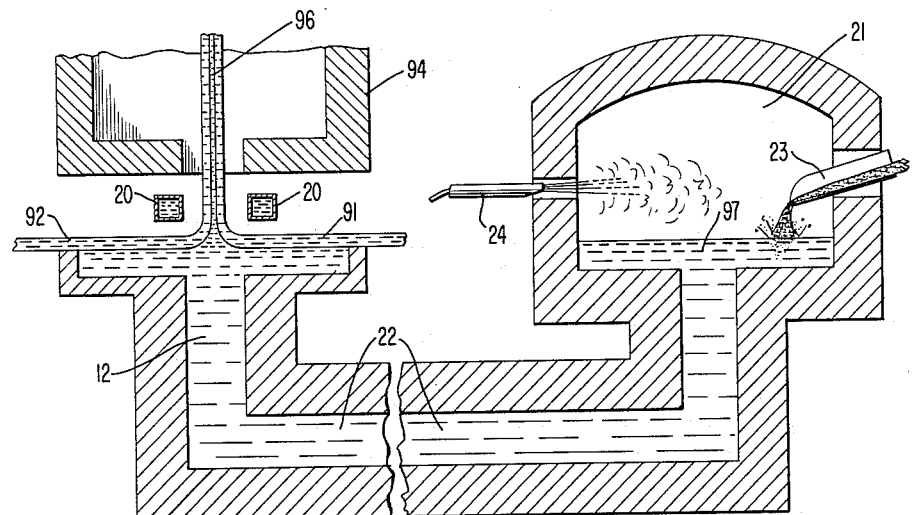

3,218,143
PROCESS FOR THE MANUFACTURE
OF FLAT GLASS
Stéphane Dufaure de Lajarte, Paris, France, assignor to
Compagnie de Saint-Gobain, Neuilly-sur-Seine, France
Filed Mar. 7, 1961, Ser. No. 94,057
Claims priority, application France, Mar. 12, 1960,
821,172
9 Claims. (Cl. 65—90)

This invention relates to the manufacture of flat glass and particularly to the formation of sheets by drawing the glass vertically upward from the surface of a bath of molten glass. The standard or prior art methods of drawing glass vertically are the Fourcault process in which the glass is drawn vertically upward from a debiteuse block, the Pittsburgh process wherein the definition of the root of the sheet is established by a submerged refractory member, and the Libbey-Owens process in which the root of the sheet is determined by mechanical means. In all these processes the glass is cooled near the root of the sheet to give it sufficient viscosity to stand the draw.

Whatever the process used, the cooling of the glass near the root of the sheet is produced by radiation of the heat of the glass upon cooling elements and by the cooling effect of the surrounding atmosphere. This cooling being relatively slow, the speeds of drawing are low compared to those obtained by such a process as rolling, in which the cooling of the glass sheet is accomplished by thermal conduction to cold contacting surfaces. Because of the limitations of the cooling process in vertical drawing, and as a result of variations in viscosity derived from the variations in the transmission of heat from different parts of the sheet, imperfections in the thickness of the sheet and imperfections in the flatness of its surfaces occur.

It is an object of this invention to overcome, or at least to materially reduce, the foregoing imperfections.

It is also an object of the invention to make a new kind of flat glass composed of a sheet having outer layers of one composition and an occluded interlayer of material of different composition, which may be glass or enamel or metal or a gas, all useful materials for the interlayer being compatible with glass and fluid at the temperature of formation of the sheet. This flat glass differs from the former types of glass sandwich, in that the interlayer is occluded, and is formed by adhesion of the fluid, compatible material to at least one of a plurality of layers of molten glass, or by entrapment between such layers of glass as they are joined and drawn away from and out of contact with such compatible material.

Another object is to make flat glass by forming two layers of glass and joining the layers to form a unitary sheet, with or without an interlayer of compatible material of other composition than the layers. A particular object is to make double mirrors in which the interlayer is a reflective metal, needing no special treatment of the glass and no coating to prevent tarnish.

Other objects are to form novel glasses for different purposes including, inter alia, stressed glass requiring no tempering, and light-diffusing glass.

The objects of the invention, as to process, are accomplished generally speaking, by a method of making flat glass that comprises moving layers of molten glass toward each other over the surface of a denser supporting liquid having good thermal-conductivity until they meet, joining them to each other and drawing them away from the supporting liquid as a single sheet, and cooling the conjoined sheet.

The objects of the invention as to novel products are accomplished, generally speaking, by sheet glass comprising two conjoined layers with or without an occluded accretion of coherent foreign material.

The objects of the invention as to apparatus are accomplished, generally speaking, by apparatus for the making of flat glass which comprises means to hold a molten supporting material, means to move oppositely directed layers of glass onto the molten, supporting material, means to draw the said layers of glass away from the supporting material as a single sheet, and means to control the temperature of the sheet, the layers, and the supporting material.

In the invention the sheet of glass is formed by two layers of molten glass moving toward each other and toward the drawing plane on the surface of a denser supporting liquid having good thermal-conductivity, which has a temperature lower than that of the glass layers before they come into contact with the liquid support. By means of this process there are produced two layers of glass, the viscosity of which is increased by contact with the liquid support of uniform and cooler temperature, which are joined together at the vertical drawing plane to form a single sheet, and which will be more or less rigid according to the degree of cooling which has been produced by contact with the liquid support.

The liquid support may be contained in a tank, placed at the bottom of the drawing kiln, which may have any suitable conformation.

The metals and alloys which may serve as the liquid support, when molten, should have good thermal conductivity in order to assure a uniform cooling of the glass layers which are to form the unified, drawn sheet; they should also have low viscosity in order to offer a minimum resistance to the motion of the glass layers across the surface of the supporting bath.

The surface of the liquid support is protected from contact with the air by the layer of glass and there is consequently no oxidation of the support. This permits the use of metal and alloys which are highly oxidizable without the use of a non-oxidizable atmosphere; their physical characteristics, especially their reactivity toward the glass at melting temperature are the main factors to consider, these being in the range 750–1100° C. for the drawing of the soda lime glass which is ordinarily used for window glass. The metals or alloys which may be used to support such glass should be molten in the range from 700 to 1100° C. The same principle applied to glasses having other drawing temperatures. When the drawing of a plain sheet without an interlayer is desired, molten tin has advantages due to its chemical inertia, its low miscibility with glass, its density, and its low vapor tension.

The layers of glass on the liquid support may advantageously be quite thin in order that the cooling effect due to contact with the liquid support bath shall not produce too sharp a temperature gradient in the thickness of the sheet. It is recommended, to reduce the temperature gradient in the thickness of the sheet, while increasing the speed of cooling the glass, to combine the effect of cooling by contact with the liquid support with a cooling by conventional means of the outside of the layers. In this way the invention improves drawing by providing a glass cooler throughout its mass and more thermally homogeneous than is provided by prior art drawing processes. The exterior cooling of the layers is particularly recommended when the layers which are to form the final sheet are of substantial thickness.

The possibility of cooling the layers of glass vigorously immediately before the root of the sheet has the advantage of materially limiting the region where devitrification might occur; the reserve of glass contained in the drawing kiln may, in effect, be maintained at a temperature above the temperature of devitrification and, while the glass layers move in contact with the liquid support at a relatively low temperature, devitrified glass cannot be formed because the speed of passage is high enough to prevent it.

The only regions where a devitrification could occur are in the vicinity of the walls of the tank where the refractories have temperatures between those of the reserve of glass in the drawing compartment and those of the liquid support. This devitrification may be prevented by a local application of heat, either continuous or periodic, for example by Joule effect; for this purpose one can cover the refractories by a metallic band acting as a resistor through which an electric current of heating intensity will pass. One can also establish a difference in potential between this metallic band and an electrode submerged in glass baths of the working zones, or in the liquid support under the drawing kiln, and pass a heating current through the molten glass.

According to another characteristic of the invention one may use a liquid support capable of being superficially entrained by the glass or which will react with the glass on contact. In these cases the process of the invention produces special and novel products having three layers the two outer layers being constituted by the glass from the working zone and the intermediate layer being constituted by the liquid support or by the products of reaction of that liquid with the glass. This process produces novel reflective glass, novel colored glass, novel light diffusing glass and novel stressed glass in which the central layer is protected by the external layers.

In the drawings, wherein like reference characters refer to like parts throughout the several views, FIG. 1 is a diagrammatic, perspective view, partly in vertical section, illustrating the drawing of a single sheet, the section being along the median longitudinal plane of the apparatus;

FIG. 2 is a similar vertical section showing developments and modifications;

FIG. 3 is a similar view of a reduced part of the apparatus showing further modifications;

FIG. 4 is yet another modification on a similar vertical section;

FIG. 5 is a diagram of an apparatus for forming the novel sandwiches.

Referring to FIG. 1, and to some extent to the other figures wherein like numbers refer to similar parts, the working zones of furnaces 2—2 contain fined glass 1—1, and are provided at their ends with walls 2'—2' which extend across the width of the furnaces. The level of the glass 9 is above the level of the end walls 2'—2' so that the glass can flow over those walls as oppositely directed layers 91, 92. The working compartment 2 comprises a gap 4 at its central part, under the drawing kiln 3. In said gap is placed a metallic tank 6 internally covered with a refractory material 7. For the purpose of this part of the description it may be assumed that the substance 12 contained in the tank 6 is molten tin. Cooling means such as water pipes 11 extend across the ends of the furnace 2 and serve to ensure tightness between tank 6 and furnace 2 in solidifying the glass 10. The tops of walls 8 of the central tanks 6, 7 are on a level with the tops of walls 2'—2' or slightly below. The layers of glass 91, 92 flow toward each other until they meet at the drawing plane, which extends vertically upward through the drawing kiln 3, the walls of which are of refractory material. Their distance from the upper glass level is of several centimeters. The layers 91, 92 are joined together at the median plane and are drawn upward as a unified sheet by rollers 5—5, the progress of the layers being in the direction of the arrows $f_1$, $f_2$ and the progress of the sheet being in the direction of the arrow $f_3$. The root of the sheet is indicated at 93.

In the normal operation of the apparatus the tin serves to remove calories from the glass and no heating means are to be put in action in tank 6. It is only necessary to heat the tin to the convenient temperature at the beginning of the operation and the heating of the tank may be obtained by any heating means, external or internal, and in particular by heating the metallic shell 6 by Joule effect. Usually the temperature of the tin will be somewhat lower than that of the glass in the furnaces 2—2, so that the faces of layers 91, 92 which engage the tin are cooled by the tin. If it is desired to maintain the temperature of the tin from 50 to 300° below that in the glass furnaces this temperature may be controlled by any heating or cooling means.

In order to achieve, for the upper portion of the layers 91, 92, a cooling similar to that which is imparted by the molten tin 12, there are provided conduits 20—20 through which cooling liquids such as water can be circulated. By the combined use of these temperature control means any desired temperature can be provided for the layers 91, 92 so that they shall have a satisfactory viscosity when they are joined together at the drawing plane of the apparatus. The rollers 5 grip the unified sheet and raise it away from the surface of the supporting liquid 12.

In the form of the invention shown in FIG. 1 there is produced a single sheet by the unification of the two layers. In general, the natural cooling of the molten tin through the envelope 6 is sufficient to keep it cooler than the glass layers it carries.

In the modification shown in FIG. 2 the cooling of the supporting fluid 12 is obtained by providing the wall 6 with fins 13. One may also supply blowers 14 which direct cold air against the part 6a of the metallic shell of the tank and effect the cooling.

In order to prevent devitrification at the border of the tank one may, as shown in FIG. 3, supply members 15 which may be either resistors or electrodes adapted to flow current through the glass. These heaters will usually extend the full width of the zones 1—1.

The cooling of the bath may also be provided by thermal exchange between the supporting liquid and fluids which circulate through a jacket in direct contact with the liquid, such as tubes extending transversely out of the tank beneath the layers 91, 92. Such cooling pipes are indicated diagrammatically at 95. This enables one to regulate and localize the cooling of the bath.

As indicated in FIG. 4, one may place a cooling tube 16 underneath the root of the sheet and thereby assure the cooling of the layers at their point of junction to the most favorable temperature for their unification and drawing.

As indicated in FIG. 2 the layers of glass 91, 92 move across the liquid support, which has a temperature less than that of the molten glass, the cooled surfaces 18-18a glide across the liquid support in the directions of the arrows and are joined in the drawing plane 19 to form a sheet of which the core is at a lower temperature and is more rigid than in known processes of drawing, which permits a higher speed of drawing.

In order to exactly adjust the level of the liquid support, or to compensate for accidental losses of this liquid, the tank 6, 7 may be provided with a constant level feed which, being of known construction is not shown. Such apparatus is particularly useful when the liquid support is captured by the glass layers and carried into the sheet.

In FIG. 5 is shown an apparatus for the manufacture of a novel glass sandwich having outer layers formed from layers 91, 92 and an inner layer 96 which is composed of the material 97, which issues from the furnace 21. The furnace 21 receives through trough 23 a supply of material, for example enamel, which is brought to the desired temperature by burner 24, and flows through a passage 22 to form a support for the layers 91, 92. This enamel is preferably denser, less viscous and cooler than layer 91, 92. As the layers move across the surface of the enamel the enamel is captured by accretion, by adhesion, by occlusion and is carried out between the layers 91, 92 as a continuous layer 96, forming a sandwich having outer-layers of the composition of the glass in working zones 11. In some cases a decorative effect is achieved by drawing a material between the layers which forms only a discontinuous film. In this apparatus the level is exactly maintained by regulating the flow of enamel 23.

In the following examples there is described the manufacture of special products containing three layers which are obtained by using different liquid supports which are entrained by the glass or which exert a physico-chemical action on the glass. In general those foreign materials which wet the glass, or which adhere to the glass, are more adapted to the formation of the novel sandwiches, while those supporting liquids which do not wet the glass and not tend to adhere to the glass tend to the production of unified sheets which lack a core.

*Example 1*

Using tin as liquid support in an apparatus according to FIGS. 1 and 2, the glass having the following composition

| | Percent by weight |
|---|---|
| $SiO_2$ | 71 |
| $Al_2O_3$ | 1.5 |
| $Na_2O$ | 14 |
| $CaO$ | 10 |
| $MgO$ | 3.5 | there is maintained outside the area covered by tin, a temperature ranging between 1100 and 1200° C., that is a temperature at which devitrification cannot occur.

The tin is maintained at a temperature between 800 and 1050° C. according to the speed of drawing of the sheet, which will be the faster as the temperature is lower. No devitrification o fthe glass may occur because the glass remains only a few minutes in said area.

It must be noted that at the given temperatures between 800 and 1050° C. the two glass layers are always perfectly united because the glass is sufficiently fluid.

Experience has indicated that the uniting of the two glass layers may be obtained above 750° C. in the case of an ordinary sodolime glass. For other glasses the viscosity must be lower than the viscosity of ordinary glass at about 750°, that is about $10^7$ poises.

*Example 2*

The liquid support was tin or an alloy of tin and aluminum, the wetting power of which with respect to glass was increased by introducing minor quantities of metals such as magnesium or the alkaline metals, a few percent being adequate, based on the weight of the alloy or the tin. Under these conditions a metallic film was caught between the two layers of glass (soda lime glass of the standard type used in making window panes) and there was produced a product constituted by thin metallic layer sandwiched between the outer layers of glass. The metallic layer was continuous and the glass could be used as a mirror without protecting the metallic layer by a coating such as paint or varnish.

(The composition of glass and the temperatures were the same as in Example 1.)

*Example 3*

The liquid support was composed of an easily fusible glass having a viscosity less than 100 poises at the temperature range used for the drawing. Glasses of this type are used as enamels for the decoration of bottles and containers. This glass was colored by the addition of coloring material such as cobalt and chromium salts or oxides. The following table covers the composition in weight percent of three glasses of this type in which the coefficient of expansion is close to that of the window glass used for the outer layers:

| | a | b | c |
|---|---|---|---|
| $SiO_2$ | 3.4 | | 11.6 |
| $Na_2O$ | 0.4 | | |
| $B_2O_3$ | 25 | 23.9 | 9.6 |
| $Al_2O_3$ | 2.2 | | |
| $PbO$ | 53 | 52 | 78.8 |
| $BaO$ | 16 | 15.2 | |
| $ZnO$ | | 8.9 | |

Each of the glasses was tested after the incorporation of 0.1 to 1.5% of cobalt oxide to impart color.

The upper layers of the liquid support, constituted by a glass or enamel of this type, were entrained by the glass and formed a colored layer along the median plane of the sheet.

The intensity of the color may be changed by changing the proportion of coloring material added or by changing the thickness of the layers entrained, which increases in thickness as the viscosity of the liquid support increases, the viscosity being increased by modifying the temperature or the composition of the liquid support.

It is possible to use many compositions for the interlayer which are not useful for enameling the outer surface of glass. It is well known that glass and enamels are the more readily attacked by atmospheric humidity and chemical agents as they are poor in formative elements such as silica, or boronoxide, and rich in readily fusible elements such as lead oxide, and such low resistance glass cannot be used in exterior work. According to the process of this invention this disadvantage does not exist because the layer of colored glass is protected by the exterior layers of the sandwich and the question of attack by humidity and chemical agents does not arise.

The enamels utilised must have a greater fluidity than the ordinary glass.

The three cited enamels melt at about 500° C. but have viscosities which decrease rapidly above said temperature so that the viscosities are lower than 100 poises at 800° C. and still further decrease to some tens of poises at the upper limit of temperature suitable to form the sheet.

The nature and the appearance of the sandwich glass obtained vary according to the viscosity of the enamel and the drawing conditions, in particular the temperatures of the glass and enamel. If the enamel is very fluid the film carried away has at most a thickness of some tenths of m./m. Such thickness is suitable for colored glazings more or less tinted with oxides giving strong colours, as cobalt oxide.

If the enamel has the indicated fluidity of 100 poises, the film carried away may have a thickness of about a millimeter, which will produce relatively dark colored glazings in particular if the oxides utilised such as copper oxide or chromium oxide have relatively low coloring power.

A particular advantage of this invention is that glass sheets thus produced have an identical appearance on both sides.

*Example 4*

The liquid support was composed of a fusible glass of which the basic composition and viscosity are similar to those of Example 3, with this difference that the coloring oxide was replaced by opacifying agents including, in different tests, tin oxide, titanium oxide, and zirconium oxide and fluorides in proportions known to have different opacifying effects. Window glass outer layers were used. The product comprised sheets which were light-diffusing, or opaque, or translucent, depending upon the thickness of the internal layer and on the nature and proportions of the opacifying agents which they contained.

As in Example 3 the thickness and the transparency of the diffusing layer may be easily modified by altering the temperature of the enamel.

Example 5

The liquid support was composed so as to react with the outer layers of glass. A fusible glass of the type given in Examples 2 and 3 was melted in the presence of a reducing medium by introducing carbon, in one case, and organic material in another. The ordinary soda lime glass used for the outer layers, on the contrary, was an oxidizing glass which had been produced by introducing into the vitrifiable raw material a small portion of oxidizing agents such as sulfates and nitrates, arsenic oxide, antimony oxide, and cerium oxide having been employed in the tests. The oxidizing glass reacted with the liquid support to produce fine gaseous bubbles of $CO_2$ or $SO_2$ which according to the high viscosity of the glass are entrapped and remain localised along a plane in the interior of the sheet, producing a light diffusing glass.

Example 6

The liquid support was composed of molten tin containing hydrogen in solution, which had been obtained by melting the tin in a hydrogen atmosphere. It may also be obtained by melting the tin in a gas containing hydrogen and by bubbling such a gas through the molten tin. In contact with the glass, the hydrogen which is dissolved in the liquid support is released, producing fine bubbles which are occluded and localized in the interior of the sheet, producing a diffusive glass.

Example 7

The liquid support was composed of a glass of which the coefficient of expansion is greater than that of the glass composing the outer layers. After drawing and cooling there was obtained a glass constituted of three layers, the two external layers being in compression and the interior layer under tension by reason of the greater contraction of the interlayer. There was thus produced a glass similar to tempered glass having the interlayer in extension and outerlayer in contraction without using the ordinary method of fast cooling. This product is analogous to such tempered glass. It breaks into small pieces and resists mechanical and thermal shocks better than annealed glass. The intensity of strains may be modified either by changing the thickness of the respective layers or the respective coefficients of expansion of the two glasses.

The advantages of the invention have been set forth in large measure hereinabove and consist not only in the novel process but in the accomplishment of the objects of the invention and in the novel products and apparatus.

In the preferred form of the invention the layers of glass glide on a supporting liquid which is denser, of good thermal conductivity, and of lower temperature than that of the glass as it approaches the supporting liquid. Temperature control may be maintained over the glass layers as they approach the supporting bath, over the supporting liquid, over the root of the sheet, and over the surface of the sheet as it approaches the root. The temperature of the formed sheet may be controlled as in the prior art, or it may be allowed to cool naturally as it ascends through the vertical drawing kiln.

As many apparently widely different embodiments of the present invention may be made without departing from the spirit and scope thereof, it is to be understood that the invention is not limited to the specific embodiments.

What is claimed is:

1. A method of making flat glass that comprises flowing two layers of molten glass onto the surface of a denser supporting liquid, the supporting liquid being cooler than the layers of the molten glass whereby the lower surface of each layer is cooled, moving the two layers of molten glass toward each other over the surface of the supporting liquid until they meet, joining the layers together and drawing them away from the supporting liquid as a single sheet having the cooled lower surfaces of the layers at the interior of the sheet, and cooling the conjoined sheet.

2. The method of claim 1 in which the temperature of the supporting liquid is 50°–300° below the temperature of the supported glass, but at a temperature such that the lower surface of each of said layers of glass cooled thereby remains sufficiently fluid for said lower surfaces to unite when the layers are drawn from the supporting liquid as a single sheet.

3. A method of making flat glass that comprises flowing two layers of molten glass onto the surface of a bath of a cooler, denser supporting liquid, the supporting liquid comprising material which is different from the glass of said layers of glass and which adheres to the glass of the layers, moving the two layers of molten glass toward each other over the surface of the supporting liquid until they meet, joining the layers together and drawing them away from the supporting liquid thereby entraining an interlayer of the said bath, as a single sheet containing an interlayer of material from said bath, and cooling the conjoined sheet.

4. The method of claim 3 in which the material of said bath is a glass of different composition and coefficient of expansion.

5. The method of claim 3 in which the material of said bath is a molten metal, of good thermal conductivity and cooler than the glass, containing a minor proportion of a metal which has an affinity for the glass of said layers.

6. The method of claim 5 in which the molten metal is an alloy of tin and aluminum containing a minor proportion of at least one metal from the group consisting of magnesium and the alkaline metals.

7. The method of claim 1 in which the supporting liquid is inert with respect to the layers of glass.

8. The method of claim 4 in which the supporting liquid is a colored glass enamel having a coefficient of expansion close to that of the glass sheets supported thereby and a viscosity less than 100 poises at drawing temperature, the glass sheets being window glass.

9. The process of claim 1 in which the supporting liquid is molten tin including hydrogen in solution.

References Cited by the Examiner

UNITED STATES PATENTS

| | | |
|---|---|---|
| 1,748,587 | 2/1930 | Smedley. |
| 1,941,392 | 12/1933 | Engels _____ 65—45 |
| 1,945,695 | 2/1934 | Kingsley _____ 65—50 |
| 2,911,759 | 11/1959 | Pilkington et al. _____ 65—65 |
| 3,000,142 | 9/1961 | Long _____ 65—83 |
| 3,127,261 | 3/1964 | Long _____ 65—83 |

OTHER REFERENCES

C. J. Philips, Glass: The Miracle Maker, N.Y., Pitman, 2nd ed., 1948, pp. 213, 260, 261.

DONALL H. SYLVESTER, *Primary Examiner.*